United States Patent [19]
Sato

[11] 4,380,809
[45] Apr. 19, 1983

[54] AUTOMATIC POWER SUPPLY SYSTEM

[75] Inventor: Tadashi Sato, Toda, Japan

[73] Assignee: Clarion Co., Ltd., Tokyo, Japan

[21] Appl. No.: 175,455

[22] Filed: Aug. 5, 1980

[30] Foreign Application Priority Data

Aug. 6, 1979 [JP] Japan .......................... 54-107644[U]

[51] Int. Cl.³ .......................................... G11B 31/00
[52] U.S. Cl. .................... 369/6; 307/10 R; 307/38; 307/115; 307/155; 369/21
[58] Field of Search ....................... 369/1, 6, 7, 11, 12, 369/19, 20, 21, 2; 455/349, 343; 360/177; 307/38, 115, 155, 10 R

[56] References Cited
U.S. PATENT DOCUMENTS

| | | | |
|---|---|---|---|
| 3,368,200 | 2/1968 | McNicol | 369/2 |
| 3,646,278 | 2/1972 | Panizzi | 369/6 |
| 3,751,601 | 8/1973 | Wally | 369/11 |
| 4,323,787 | 4/1982 | Sato et al. | 307/38 |

Primary Examiner—Bernard Konick
Assistant Examiner—Donald McElheny, Jr.
Attorney, Agent, or Firm—Flynn, Thiel, Boutell & Tanis

[57] ABSTRACT

An automatic power supply system for an acoustic apparatus having at least a cassette deck box and an audio box connected thereto, the deck box including an automatic power supply circuit and a tape/radio selector switch. A power source +B is supplied to the automatic power supply circuit or a relay control circuit of the audio box through the selector switch. The power source +B is further supplied to an audio amplifier through a relay which is adapted to be energized or deenergized by the relay control circuit.

2 Claims, 1 Drawing Figure

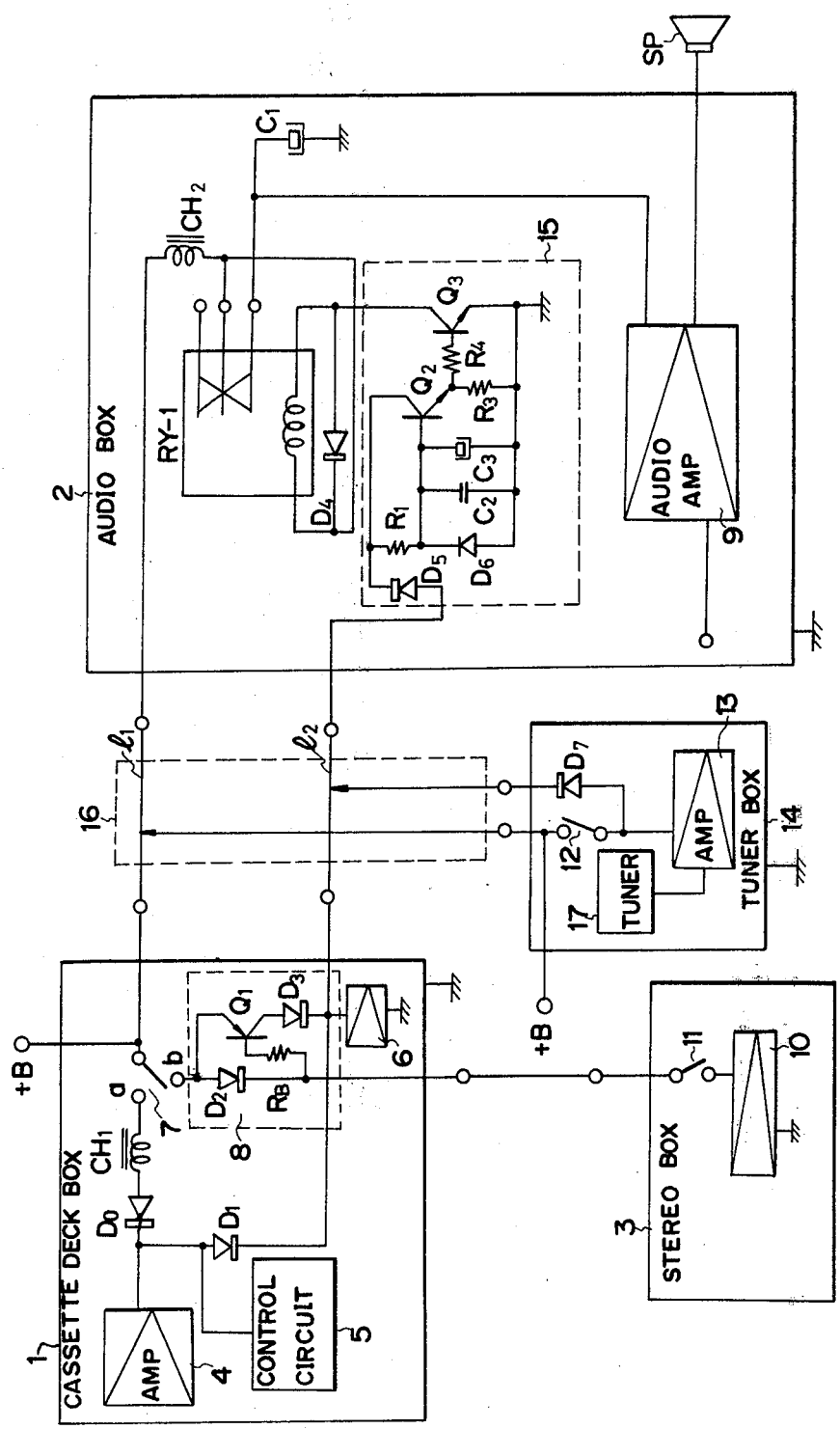

AUTOMATIC POWER SUPPLY SYSTEM

BACKGROUND OF THE INVENTION

1. Field of the Invention

This invention relates to an automatic power supply system, and more particularly, but not by way of limitation, to an automatic power supply system suited to a car stereo etc. having a cassette deck box, an audio box and a tuner box, which systems includes a cassette-preferential circuit and an automatic power supply circuit adapted to operate conjointly with the cassette-preferential circuit so that the system may be operative at a low frequency.

2. Description of Prior Art

In a conventional power supply system for a car stereo etc., a separate on-off switch is provided for each of several boxes to control the system so that where the car stereo etc. has two or more boxes to be supplied with electric power, wiring for the power supply becomes very complicated and the number of wiring codes is increased. In addition, since the system provides only a partial automatic power supply, there is a troublesome problem in combination with the cassette-preferential circuit.

OBJECTS OF THE INVENTION

It is therefore an object of the present invention to provide an automatic power supply system which is capable of obviating the disadvantages of the conventional technique.

It is another, more specific object of the present invention to provide an automatic power supply system with simplified wiring for the power supply and capable of providing automatic power supply to plural boxes by additionally employing one lead wire.

SUMMARY OF THE INVENTION

In accordance with the present invention, there is provided an automatic power supply system which comprises:
 a cassette deck box containing a cassette deck and circuits associated therewith;
 an audio box containing an audio amplifier;
 an automatic power supply circuit provided in said cassette deck box;
 a tape/radio selector switch provided in said cassette deck box and connected to a power source;
 a relay control circuit provided in said audio box; and
 a relay adapted to be controlled by said relay control circuit;
 said automatic power supply circuit being connected to said power source through said selector switch, and said relay control circuit being connected to said selector switch and to said automatic power supply circuit through said selector switch, thereby to apply a supply voltage to said audio amplifier through said relay.

BRIEF DESCRIPTION OF THE DRAWING

The FIGURE is a block diagram of one form of the automatic power supply system embodying the present invention.

DESCRIPTION OF PREFERRED EMBODIMENT

Referring now to the drawing, 1 is a cassette deck box for mounting a cassette deck therein, 2 an audio box, 3 a stereo box, 4 an amplifier for a magnetic head of the cassette deck, 5 a control circuit for a mechanism of the cassette deck, 6 a control amplifier for the cassette deck, and 7 a cassette-preferential switch interlocked with a tape drive mechanism (not shown) and adapted to be closed and opened upon loading and removal of a cassette (This is old and known). 8 is an automatic power supply circuit, 9 an audio amplifier provided in the audio box 2, 10 an amplifier, 11 a power (ON/OFF) switch for the amplifier 10, 12 a power (ON/OFF) switch for a tuner box, 13 an amplifier, 14 a tuner box, 15 a relay control circuit. In the FIGURE are only shown power supply systems relevant to the present invention. $D_0$, $D_1$, $D_3$, $D_5$ and $D_7$ are diodes for preventing backward current flow, $D_2$ and $Q_1$ are a diode and a transistor for detecting a current which actuates the automatic power supply circuit 8, $R_B$ is a bias resistor, $D_6$ a bias holding diode, $Q_2$ and $Q_3$ relay controlling transistors, $R_1$ a bias resistor, $C_2$ a capacitor for a bypass for high-frequency components, $C_3$ a delay capacitor, $R_3$ and $R_4$ bias resistors, $CH_1$ and $CH_2$ choke coils, and $C_1$ an arc-suppressing capacitor.

When a cassette tape (not shown) is inserted into the cassette deck box 1, the switch 7 is actuated so as to be connected to a terminal a. Then, a power source $+B$ is applied to the amplifier 4 and the mechanism control circuit 5 through the diode $D_0$, and is further applied to the control amplifier 6 and the relay control circuit 15 through the diode $D_1$.

Upon application of the power source $+B$ to the diode $D_5$ of the audio box 2, the relay driving transistors $Q_2$ and $Q_3$ conduct through the bias resistor $R_1$ and the delay capacitor $C_3$ and the relay RY-1 is energized. As a result, the power source $+B$ is applied to the audio amplifier 9 to operate the same. An output from the tape deck head is applied to the audio amplifier 9 through the amplifier 4, is subjected to amplification there and is then supplied to a loud-speaker SP.

When the cassette tape is removed from the cassette deck box, the switch 7 is actuated so as to be connected to a terminal b to put the automatic power supply circuit 8 into a standby condition. Under this condition, when the switch 11 of the stereo box 3 is closed, a current flows through the diode $D_2$ to cause a forward voltage $V_F$ across the diode $D_2$ and the transistor $Q_1$ is turned on. Therefore, the power source $+B$ is applied to the control amplifier 6 and the relay control circuit 15 to energize the relay RY-1. As a result, the power source $+B$ is supplied to the audio amplifier 9 to operate the same and an output from the amplifier 10 is also supplied to the amplifier 9 to be amplified there and applied to the loud-speaker SP.

A junction cable 16 may be employed to connect the tuner box 14, which contains an amplifier 13, a tuner circuit 17 etc. therein, to a power line cable $l_1$, $l_2$ through a socket (not shown). In this arrangement, when the switch 12 is closed, the power source $+B$ is supplied to the relay control circuit 15 through the diode $D_7$ to operate the audio amplifier 9. Therefore, an output from the amplifier 13 in the tuner box 14 is applied to the amplifier 9 to be amplified thereby and supplied to the speaker SP.

As apparent from the foregoing description, in accordance with the present invention, the wiring for supplying power can be simplified and a plurality of boxes can receive automatic power supply by employing only an additional lead wire as compared with the conventional power supply system. Furthermore, the relay control circuit can eliminate fluctuation in the operational sensitivity of the relay dependent on the relay control voltage. The cassette-preferential circuit (switch 7) permits omission of a switch which would otherwise be provided on a front panel of the car stereo etc., and thus serves to simplify the wiring, allow easy provision of the tuner box etc. and provide a systematic circuit arrangement for supplying power.

I claim:

1. In a power supply apparatus for electrically connecting an electric power supply to a plurality of boxes, including at least a cassette deck box, a stereo box and an audio box, which apparatus includes:

an electric power supply line connected to an electric power supply;

a cassette responsive selector switch connected to said electric power supply line, said switch being located in said cassette deck box and being switched by loading of a cassette into said cassette deck box and by unloading of the cassette from said cassette deck box;

an automatic electric power supply circuit located within said cassette deck box, said circuit being connected to said cassette responsive switch and supplied thereby with electric power, depending on the state of said cassette responsive switch;

a relay located within said audio box and connected by a control line to said automatic supply circuit, which circuit energizes said relay and thereby causes said relay to provide electric power from said power supply line to a circuit within said audio box in response to said cassette responsive switch being switched so as to provide power to said automatic supply circuit; and a first manually operable switch located within said stereo box and connected between said automatic supply circuit and a circuit within said stereo box;

said automatic supply circuit including at least one transistor and a first diode, said first diode being coupled to said cassette responsive switch and to said transistor, said transistor being turned on and providing electric power to said relay and to a circuit within said cassette box when said automatic supply circuit is actuated by a forward voltage across said first diode; and said cassette responsive switch being switchable between a tape operating terminal and a stereo box operating terminal, said first manually operable switch in said stereo box being connected to said stereo box operating terminal of said cassette responsive switch through said first diode, closure of said first manually operable switch in said stereo box and switching of said cassette responsive switch to said stereo box operating terminal both being required to produce a forward voltage across said first diode and turn on said transistor and thereby provide electrical power to said relay and said circuit within said cassette deck box, the last-mentioned circuit being a control amplifier, a second diode being connected between said tape operating terminal of said cassette responsive switch and a point at which said transistor applies said electric power to said control amplifier, said second diode being oriented to positively block electric current flow from said point back toward said tape operating terminal of said cassette responsive switch, said cassette deck box further including a tape pre-amp connected between said tape operating terminal of said cassette responsive switch and said second diode, said tape pre-amp receiving electric power only when said cassette responsive switch is switched to said tape operating terminal, the improvement comprising a tuner box and a junction cable for connecting said tuner box to said power supply line and said control line, said tuner box including a second manually operable switch, a tuner, a tuner amplifier connected to said tuner and a third diode, said second manually operable switch being connected between said tuner amplifier and said power supply line through said cable, and said third diode being connected from the junction between said second switch and said tuner amplifier to said control line through said cable, whereby electric power is provided to operate said tuner amplifier and to energize said relay when said second manually operable switch is closed.

2. The apparatus according to claim 1, wherein said relay has two input terminals, and including a relay control circuit having a fourth diode connected between said control line and the collector of a second transistor, a first resistor connected between the collector and base of said second transistor, a fifth diode and at least one capacitor connected between the base of said second transistor and ground, a second resistor connected between ground and the emitter of said second transistor, a third resistor connected between the emitter of said second transistor and the base of a third transistor, and a sixth diode connected between said input terminals of said relay, the emitter of said third transistor being connected to ground, the collector of said third transistor being connected to one of said input terminals of said relay, and the other of said input terminals of said relay being connected to said electric power supply line.

* * * * *